July 31, 1945.  H. O. PETERSON  2,380,868
FREQUENCY MEASURING SYSTEM
Filed May 29, 1943  3 Sheets-Sheet 1

INVENTOR
HAROLD O. PETERSON.
BY
ATTORNEY

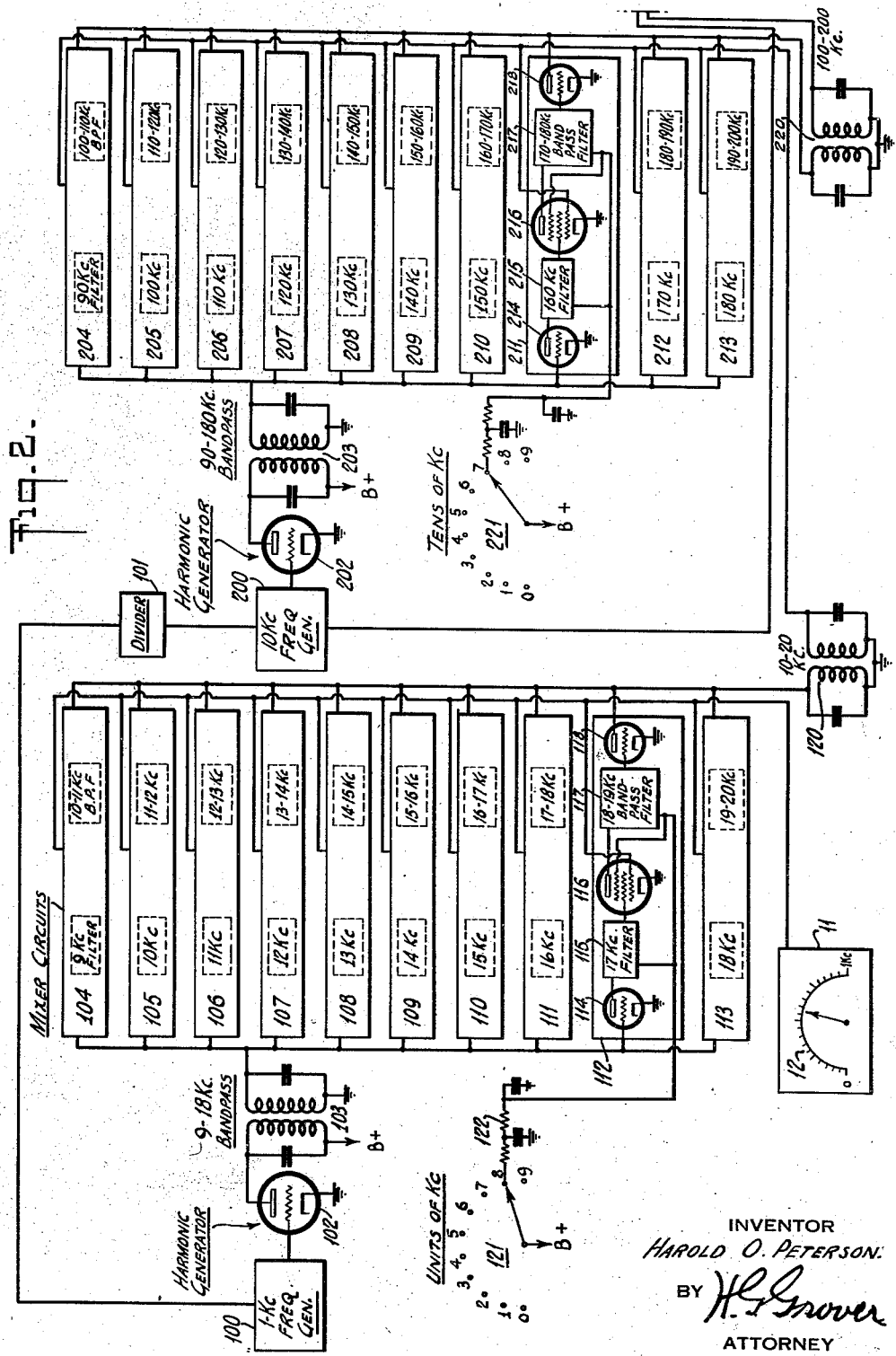

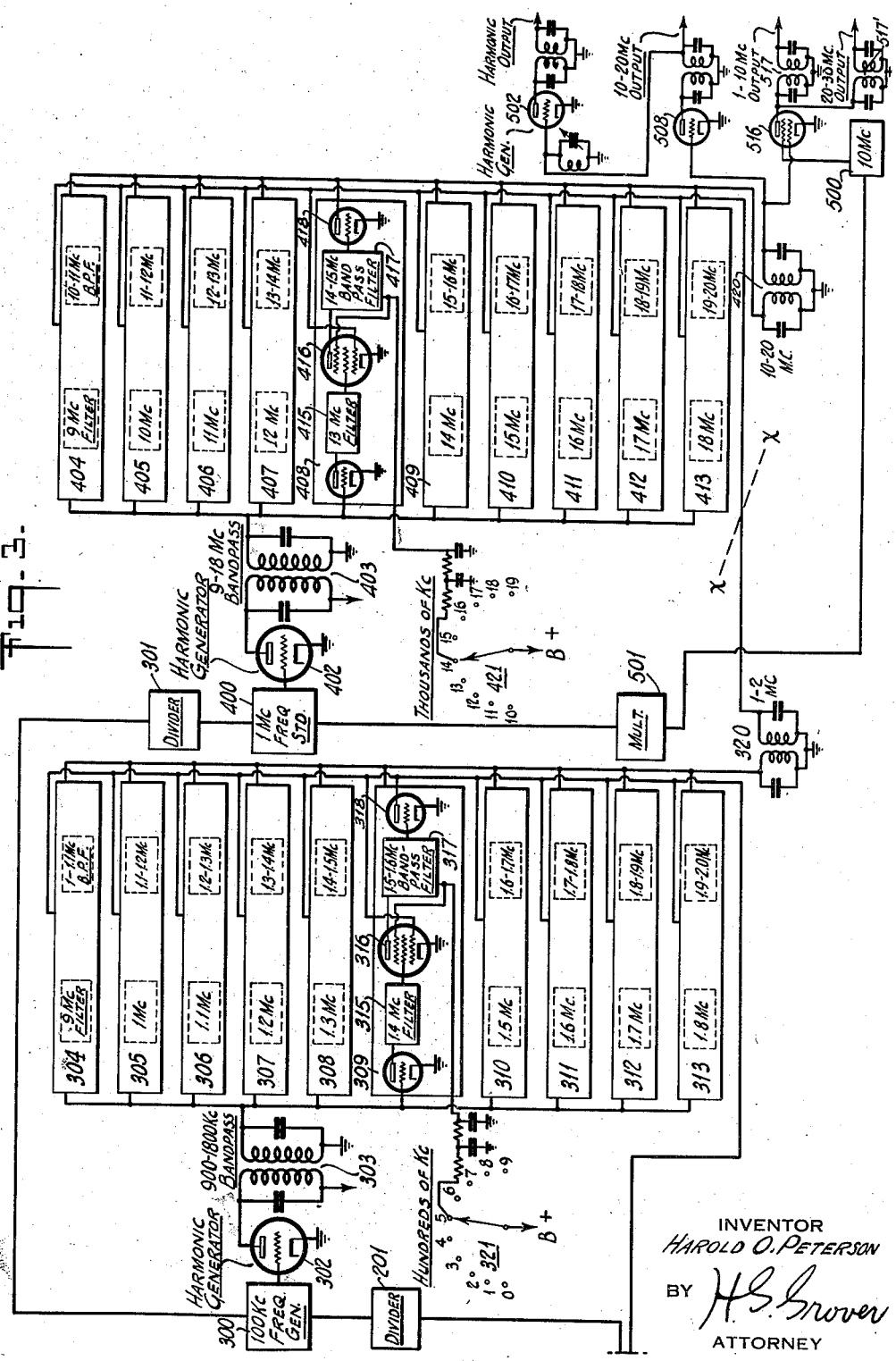

Patented July 31, 1945

2,380,868

UNITED STATES PATENT OFFICE 2,380,868

FREQUENCY MEASURING SYSTEM

Harold O. Peterson, Riverhead, N. Y., assignor to Radio Corporation of America, a corporation of Delaware Application May 29, 1943, Serial No. 489,085

3 Claims. (Cl. 250—36)

The present invention relates to frequency measuring and frequency generation systems. More particularly, the present invention relates to a system whereby it is possible to generate a precisely determined radio frequency wave. This precisely determined radio frequency wave may be used for the measurement of carrier frequencies from other sources. It may also be used in other functions where precisely determined carrier frequency is desired such as, for example, in radio transmission.

An object of the present invention is to generate a precisely determined radio frequency wave.

Another object is the provision of a source of radio frequency wave which may be readily adjusted to any output frequency.

A further object is the provision of a radio frequency generator which is so calibrated that the resultant output frequency may be readily determined from the calibrations of the generator.

A further object of the present invention is the provision of a source for radio frequency waves which will have an accuracy better than one part in 10 million.

The foregoing objects, and others which may appear from the following detailed description, are attained by providing a single highly precise source of radio frequency energy. From the single source, by means of harmonic generators, multivibrators, frequency multipliers, etc., a plurality of accurately known harmonically related frequencies may be obtained. By combining selected ones of these accurately known harmonics and, further, by combining the resultant wave with the output of the precision frequency source an output wave of an accurately known frequency may be obtained.

Figure 1:
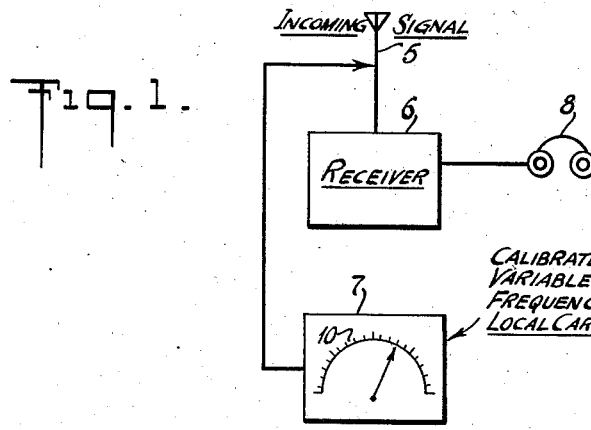
Figure 4:
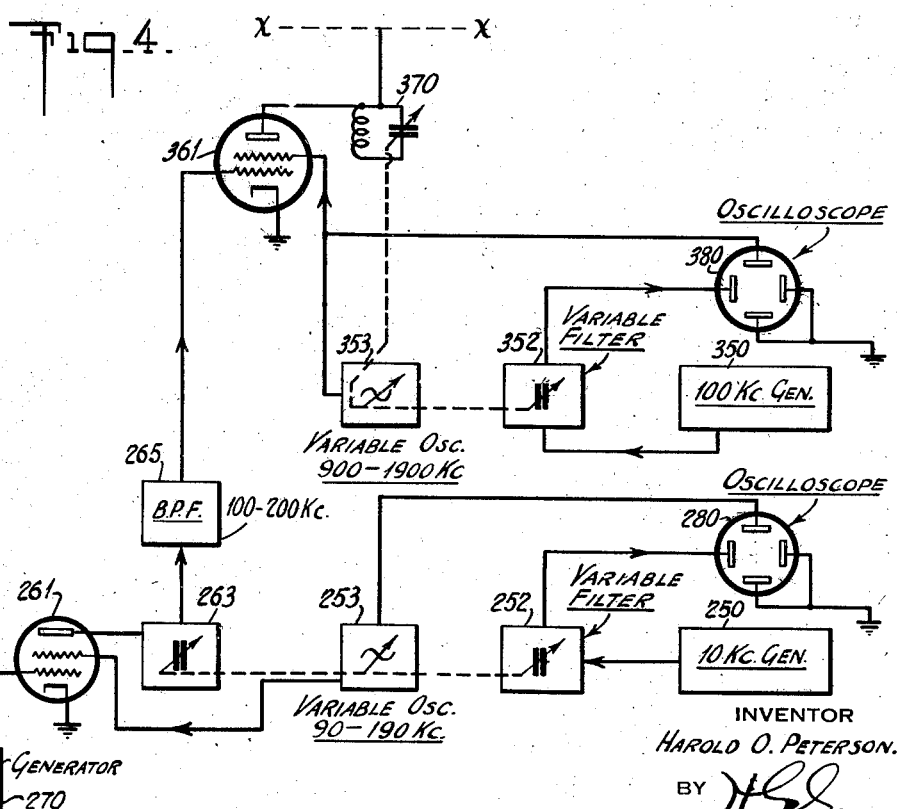

The present invention will be more completely understood by reference to the following detailed description, which is accompanied by drawings in which Figure 1 illustrates in block diagram form a system for measuring the frequency of an incoming radio frequency wave; Figures 2 and 3 illustrate in schematic form an embodiment of the present invention, while Figure 4 illustrates a modification of a portion of the present invention.

In Figure 1 is shown generally a system of measuring an incoming radio frequency wave. The incoming signal is picked up by aerial 5 and applied to the input of receiver 6. A local source of radio frequency energy 7 is also connected to the input of receiver 6. The local radio frequency source 7 is then adjusted to the same frequency as the incoming radio frequency wave. This condition is readily determined by the indicating device of the receiver which may be any one of a number of well known devices for determining zero beat such as a pair of telephones 8, or a cathode ray tube. A rectifier and galvanometer may be used if desired. It is understood that the variable frequency generator 7 is provided with the necessary calibrated scales 10 where the generated frequency may be accurately determined.

The embodiment of the present invention shown in the diagram of Figures 2 and 3 constitute a local radio frequency generator which, it is to be understood, is to be used in place of generator 7 of Figure 1. This generator is so constituted that any desired output frequency may be readily obtained and, furthermore, by means of calibrated dials and switches, it is possible to accurately read directly the resulting output frequency. The output frequency is generated by the combination of a number of harmonic frequencies controlled by a precision type of local frequency standard such as generator 400, with the further provision that it is possible to include components from a continuously variable generator 11 covering the range of 1 to 2 kc./sec. The continuously variable low frequency generator is provided with calibrated scale 12 reading direct to intervals of less than 1 cycle.

As mentioned before, the local precision standard of frequency 400 may be crystal controlled and will therefore have an accuracy of better than 1 part in 10 million. Means are provided in Figures 2 and 3 for selecting a desired channel of thousands, hundreds, tens and units of kc./sec. To the units of kc./sec. are added the cycles determined by the continuously variable oscillator 11.

In the right-hand portion of Figure 3 the output from the 1 mc./sec. frequency standard 400 is applied to a frequency divider 301 and thence to a 100 kc./sec. wave generator 300. The output of generator 300 is therefore constrained to bear a definite relationship with the output of a frequency standard 400. In the particular example shown in the drawings, generator 300 operates at exactly $\frac{1}{10}$ frequency of the standard 400. Also the output from the frequency standard 400 is applied either directly or through the generator 300, through a further frequency divider 201 to a 10 kc./sec. frequency standard 200. Through a further frequency divider 101 the 1 kc./sec. frequency generator 100 is accurately maintained in a definite relationship with the output of the standard 400.

The 1 kc./sec. output wave from generator 100 is applied to a harmonic generator 102 in the output circuit of which is a band-pass filter 103 passing all frequencies from 9 kc./sec. to 18 kc./sec. with substantially uniform intensity. Consequently, harmonics from the 9th to the 18th, inclusive, of the 1 kc./sec. standard frequency generated by generator 100 are impressed on the input terminals of frequency converter circuits 104 to 113, inclusive. As shown in more detail with respect to converter circuit 112, each selector circuit includes an amplifier 114 and sharp cutting filter 115 in the plate circuit of the amplifier 114. To the output of the filter 115 is connected a control electrode of a mixer tube 116. A band-pass filter 117 is coupled to the output of mixer tube 116 to select only, for example, the sum frequency resulting from the mixing of the wave applied to a control grid of mixer 116 from filter 115 and another wave applied to another control grid of mixer 116. The character and source of said other wave will be later described. To the output of filter 117 is connected a further amplifier 118. The output circuits of the final amplifiers in each of the selector circuits, such as amplifier tube 118 of selector circuit 112 are all connected in parallel and connected to a band-pass filter 120 tuned to pass all frequencies between 100 and 200 kc./sec. The anode circuits of each of the first amplifiers and the anode and screen circuits of the mixer tube within each of the converter circuits 104 to 113, inclusive, are connected to taps of a selector switch 121 whereby any one of the converter circuits may be selectively energized to pass energy from the band-pass filter 103 to the output of band-pass filter 120. To increase the control effect, the tap switch may also energize the amplifier ahead of the desired sharp filter. Filter networks, such as network 122, may be provided in each of the connections from selector switch 121 to the converters 104 to 113, inclusive, in order to prevent stray energy from being mixed with the chosen frequency in the selected one of the converter circuits 104 to 113. Only one connection has been shown between the selector switch 121 and the converter circuits in order to avoid confusion. It is, of course, to be understood that each of the converter circuits 104 to 113 contain elements similar to those described in detail with reference to converter circuit 112 and, likewise, each converter circuit is connected to the selector switch 121 through filter networks similar to network 122. Each of the mixer tubes within selector circuits 104 to 113, such as tube 116 in the selector circuit 112, has control electrodes connected in a parallel relationship to the output of the variable frequency generator 11.

Now, for example, if selector switch 121 is placed in position to contact tap 8, anode potential will be applied to amplifier tube 114 and anode and screen potential will be applied to mixer tube 116. Therefore, the band of frequencies covering the range from 9 to 18 kc./sec. applied to the grid of amplifier tube 114 will be applied to the 17 kc./sec. filter 115. This allows only the 17 kc./sec. harmonic of generator 100 to be applied to a control grid of mixer tube 116. At the same time energy from variable frequency generator 11 is applied to another control grid of mixer 116 and as a result there will appear in the anode circuit of mixer 116 a beat frequency wave resulting from the addition of 17 kc./sec. wave applied from filter 115 and whatever frequency is applied to the mixer grid of tube 116 from the variable frequency oscillator 11. Various other combination frequencies also appear in the anode circuit but only the one specifically mentioned will be allowed to pass through band-pass filter 117 and, through amplifier tube 118, applied to band-pass filter 120.

In a similar manner the 10 kc./sec. wave generated by generator 200 is applied to a harmonic generator 202 and through band-pass filter 203 all frequencies from 90 to 180 kc./sec. are applied to the input circuits of converter circuits 204 to 213. In this particular band of converter circuits, circuit 211 has been shown in more detail. However, it will not be described in more detail since its operation is exactly similar to that of converter circuit 112 heretofore described, except that the frequencies operated on are multiplied by a factor of 10. Similar elements have reference characters corresponding to those used with reference to the first band of converters, except that they appear in the second hundred.

By means of selector switch 221 any one of the converter circuits 204 to 213 may be so energized as to mix energy from band-pass filter 120 with a selected harmonic in the 90 to 180 kc./sec. band to produce a frequency between 100 to 200 kc./sec. which is applied to band-pass filter 200. Similarly, the 100 kc./sec. output from frequency standard 300 is applied to harmonic generator 302 to produce a band of harmonics, the band between 900 to 1800 kc./sec. being selected by band-pass filter 303 and applied to the inputs of converter circuits 304 to 313, inclusive.

In these converter circuits a selected one of the harmonics in the band of 900 to 1800 kc./sec. is chosen by selector switch 321 and mixed with the output from band-pass filter 220 to produce a beat note falling in the 1 to 2 megacycle band and passed by band-pass filter 320. In the same way, harmonics are generated by harmonic generator 402 from the output of the frequency standard 400 and the band between 9 and 18 mc./sec. is selected by a band-pass filter 403 and applied to the inputs of converter circuits 404 to 413. A selected one of the harmonics within this band as selected by selector switch 421 is mixed in the appropriate mixer tube 416 with the output of band-pass filter 320 and the resultant beat frequency is applied to band-pass filter 420.

Now, if, for example, the variable frequency generator 11 is adjusted to generate a frequency of 1599.2 cycles its dial is calibrated to read 599.2; if selector switch 121 is placed in the position shown on tap 8 the selector circuit 112 will be energized. Thus, the 17 kc./sec. harmonic of harmonic generator 102 will be mixed with the 1599.2 cycle wave from generator 11 in converter 116 to produce an output frequency of 18599.2 cycles in band-pass filter 120. This frequency is applied to the converter 216 in selector circuit 211 where it is combined with a 160 kc./sec. harmonic from generator 200 to produce a new frequency of 178599.2 cycles. This frequency is passed by a band-pass filter 217 through amplifier 218 to the band-pass filter 220 whence it is applied to a selected one of the converter circuits 304 to 313, inclusive. If, for example, selector circuit 309 is chosen by placing switch 321 on tap 5 the output wave from band-pass filter 220 will be mixed with 1.4 mc./sec. harmonic from the 100 kc./sec. frequency generator 300 to produce a frequency of 1,578,599.2 cycles. This frequency is transmitted through band-pass filters 317 and 320 to mixer 416 in the group of converter circuits 404 to 413 where it is combined with the 13 mc./sec. harmonic from the 1 mc./sec. frequency standard 400 to produce an output frequency of 14,578,599.2 cycles. It will be noted that the output frequency may be read directly from the indicators of the selector switches 121, 221, 321 and 421 to which is added the reading of scale 12 of the variable frequency generator 11.

Means are also provided in the embodiment of the present invention for obtaining frequencies other than those in the range of from 10 to 20 mc./sec. Higher frequencies are obtained by means of harmonic generator 502. By means of this harmonic generator, frequencies bearing a harmonic relationship to those appearing in the band-pass filter 420 up to the order of several hundreds of mc./sec. may be obtained. Frequencies lower than 10 mc./sec. may be produced by means of converter 516 in which a 10 mc./sec. wave derived from the 1 mc./sec. frequency standard 400 by means of multiplier 501 and generator 500 is combined with the output frequency appearing in band-pass filter 420. Two ranges of output frequencies will appear in the anode circuit of converter 516. The difference frequencies may be selected by band-pass filter 517 and the sum frequencies by circuit 517'. The exact frequencies occurring in the output circuits of band-pass filters 517 and 517' are readily determined by either adding or subtracting 10 mc./sec. to or from the indicated frequency as read from the dials 121 to 421 and dial 12 of generator 11.

In Figure 4 is shown a modification of a portion of the invention shown in Figures 2 and 3 wherein the lower frequency components are supplied by variable frequency oscillators. The frequency of these waves are determined by reference to the local frequency standard. The showing of Figure 4 is to be considered as though it were substituted for the portion to the left of dotted line X, X of Figure 3.

In Figure 4 the 100 kc./sec. generator standard 350 and the 10 kc./sec. generator 250 may have their frequencies accurately controlled by reference to the 1 mc./sec. frequency standard 400 of Figure 3 in the same way as described for generators 200 and 300 of Figures 2 and 3. The output of the 10 kc./sec. generator 250 is applied to a variable filter 252 whereby a predetermined harmonic may be selected and applied to one pair of control plates of oscilloscope 280. Another wave, of the same frequency, generated by variable oscillator 253 is applied to a control electrode of mixer tube 263. At the same time another frequency within the range of 10 to 20 kc./sec. from generator 270 is applied to another control grid of mixer tube 261. This frequency may be determined by suitable calibrations on the tuning control of generator 270, or generator 270 may correspond to the arrangement of generator 250, filter 252, oscillator 253 and oscilloscope 280, already described, but operating in the range of 10 to 20 kc./sec. The output circuit of mixer 261 contains a variable filter 263 whereby only the sum frequency or the difference frequency of the selected harmonic from variable filter 253 and the variable generator 270 are permitted to appear in the output. Band-pass filter 265 passing a band of from 100 to 200 kc./sec. further filters the selected frequencies from mixer 261 and applies the result to a control grid of mixer 361. At the same time a variable filter 352 selects a band of harmonics from the output of the 100 kilocycle generator 350. The oscillator 353 supplies excitation at some harmonic of 100 kc. (between the 9th and the 19th) to another control electrode of mixer 361. In order to assure that the correct harmonic is chosen by the control of variable frequency oscillators 253 and 353, oscilloscopes 280 and 380 are provided, each having one pair of opposing beam control electrodes connected to the generators 252 and 352 and the other pair of opposing beam control electrodes coupled to the output of the variable oscillators 253 and 353. Thus by observing the Lissajous patterns on luminous screens of the oscilloscope tubes 280 and 380 and counting the number of loops in the patterns the harmonic relationship between the output of oscillators 353 and 253 with respect to the generators 350 and 250 may be determined. The output of mixer tube 361 is applied to a tuned circuit 370 whereby the sum frequencies resulting from the mixture of the two frequencies applied to the control electrodes are selected. The selected frequency is then applied as indicated by the dotted line X, X to the mixer circuits 404 to 413 of Figure 3 resulting in the same manner of operation as in the modification of Figures 2 and 3.

It is believed unnecessary to describe the modification of Figure 4 any more fully than has been done since it is believed that the correspondence between the mixing operations of the circuit of Figure 4 and those of Figures 2 and 3 may readily be seen. In the modification of Figure 4 simplicity of construction of the circuit is attained to some extent at the expense of more difficult determination of the exact frequencies mixed since the determination of frequency components requires, in Figure 4, the counting of loops in the patterns appearing on the oscilloscope screens instead of merely observing the position of tap switches 12, 221 and 321 of the embodiment of Figures 2 and 3.

It will be noted that the frequency selective circuits of 352, 353 and 370 are mechanically interconnected so that they are all tuned to the desired frequency by operation of one control. This control may have an indicator showing the approximate settings for various harmonic frequencies of generator 350. This calibration would serve to identify the order of the harmonic. The exact setting would be made by a fine adjustment to make the pattern on the oscilloscope stand still. The same system is applied to 252, 253 and 263.

While I have illustrated a particular embodiment of the present invention, it should be clearly understood that it is not limited thereto since many modifications may be made in the several elements employed and in their arrangement and it is, therefore, contemplated by the appended claims to cover any such modifications as fall within the spirit and scope of the invention.

I claim:

1. A system for producing a high frequency wave of an accurately predetermined frequency from a single invariable frequency source including, means for deriving from said source a plurality of frequencies decimally related to said source, means for producing from each of said frequencies a band of harmonics covering the interval between successive harmonics of the frequency next higher in decimal order, a bank of harmonic selectors and mixer circuits individual to each of the harmonics generated from each of said frequencies, means for coupling each of said mixer circuits of each bank to the output of the bank of mixer circuits associated with the harmonic producing means of the frequency next lower in decimal order, and means for selectively energizing one of the mixer circuits in each bank.

2. A system for producing a high frequency wave of an accurately predetermined frequency from a single invariable frequency source including, means for deriving from said source a plurality of frequencies decimally related to said source, means for producing from each of said frequencies a band of harmonics covering the interval between successive harmonics of the frequency next higher in decimal order, a bank of harmonic selectors and mixer circuits individual to each of the harmonics generated from each of said frequencies, means for coupling each of said mixer circuits of each bank to the output of the bank of mixer circuits associated with the harmonic producing means of the frequency next lower in decimal order, and means for selectively energizing one of the mixer circuits in each bank, the lowest frequency component in said high frequency wave being generated by a calibrated variable frequency oscillator covering the range between successive harmonic frequencies for the next component in decimal order.

3. Means for producing a high frequency wave of an accurately predetermined frequency from a single invariable frequency source including means for deriving from said source a plurality of waves whose frequencies are decimally related to the frequency of said source, means for producing harmonics of each of said waves, filter circuits for selecting predetermined ones of said harmonics, a variable frequency oscillator, individual means for mixing the output of said variable frequency oscillator with each of a group of harmonics from one of said decimally related waves, means for selectively energizing one of said mixing means, means associated with each of said individual mixing means for selecting one of the frequencies resulting from said mixing, and mixing means individual to each of a group of harmonics of another of said decimally related waves, means for supplying the selected one of said frequencies to all of said second mentioned group of mixers, and means for selectively energizing one of the second group of said mixers.

HAROLD O. PETERSON.